(12) United States Patent
Baugh

(10) Patent No.: US 10,926,981 B2
(45) Date of Patent: *Feb. 23, 2021

(54) METHOD OF MOTION COMPENSATION WITH SYNTHETIC ROPE

(71) Applicant: Reel Power Licensing Corp., Oklahoma City, OK (US)

(72) Inventor: Benton Frederick Baugh, Houston, TX (US)

(73) Assignee: Reel Power Licensing Corp., Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/522,209

(22) Filed: Jul. 25, 2019

(65) Prior Publication Data

US 2019/0345013 A1 Nov. 14, 2019

Related U.S. Application Data

(63) Continuation of application No. 15/666,052, filed on Aug. 1, 2017, now Pat. No. 10,421,649, which is a
(Continued)

(51) Int. Cl.
*B66D 1/52* (2006.01)
*F16L 1/19* (2006.01)
(Continued)

(52) U.S. Cl.
CPC ............... *B66D 1/52* (2013.01); *B66C 13/02* (2013.01); *F16L 1/19* (2013.01); *B63B 27/08* (2013.01)

(58) Field of Classification Search
CPC .. Y10T 24/3969; Y10T 24/3996; F16G 11/04; F16L 1/19; E21B 19/12; B63B 27/10; B63B 35/03; B63B 35/44
USPC ...... 114/244, 253, 312; 166/77.53; 175/423; 212/272, 277, 307; 24/115 M, 136 R; 254/266, 277; 294/102.1, 102.2; 405/158, 170; 414/803
See application file for complete search history.

(56) References Cited

U.S. PATENT DOCUMENTS 1,864,802 A   6/1932 Clark
2,127,115 A   8/1938 Hamilton
(Continued)

*Primary Examiner* — Gregory W Adams
(74) *Attorney, Agent, or Firm* — Phillips Murrah PC; Martin G. Ozinga

(57) ABSTRACT

A method of providing motion compensation of a subsea package with a synthetic rope comprising attaching the synthetic rope to the subsea package, supporting a first gripper with a wire rope from a winch capable of motion compensation control characteristics and gripping the synthetic rope with the first gripper, supporting a second gripper with a second wire rope, and repeating the following sequence: lowering the first gripper, the synthetic rope, and the subsea package a first distance, gripping the synthetic rope with the second gripper, releasing the first gripper from the synthetic rope, raising the first gripper the first distance, gripping the synthetic rope with the first gripper, releasing the second gripper from the synthetic rope, such that when the subsea package is lowered proximate the subsea landing location the winch capable of operating with motion compensation characteristics can operate to compensate for the vessel motion and smoothly lower the subsea package to the subsea landing location.

6 Claims, 4 Drawing Sheets

Related U.S. Application Data continuation of application No. 14/149,200, filed on Jan. 7, 2014, now abandoned.

(51) Int. Cl.
  *B66C 13/02*    (2006.01)
  *B63B 27/08*    (2006.01)

(56) References Cited

U.S. PATENT DOCUMENTS

| | | |
|---|---|---|
| 3,952,377 A | 4/1976 | Morell |
| 4,572,565 A | 2/1986 | Epstein |
| 5,380,129 A | 1/1995 | Maloberti et al. |
| 5,392,496 A | 2/1995 | Johnson |
| 6,776,560 B2 | 8/2004 | Moszkowski et al. |
| 7,182,212 B2 | 2/2007 | Frumau et al. |
| 7,875,056 B2 | 1/2011 | Jervis et al. |
| 7,891,060 B2 | 2/2011 | Ross et al. |
| 8,002,027 B2 | 8/2011 | Angelle et al. |
| 8,292,544 B2 | 10/2012 | Ardavanis et al. |
| 10,421,649 B2 * | 9/2019 | Baugh ............. B66D 1/52 414/226.05 |
| 2002/0129755 A1 | 9/2002 | Hagen et al. |
| 2012/0003047 A1 | 1/2012 | Signaroldi et al. |

* cited by examiner

METHOD OF MOTION COMPENSATION WITH SYNTHETIC ROPE

TECHNICAL FIELD

This invention relates to the method of providing motion compensation operations for synthetic rope especially as relates to deep water lifting and lowering operations.

BACKGROUND OF THE INVENTION

Offshore equipment packages are often placed on the ocean floor by lowering on a cable to the desired location. Especially when one package is to be landed on the top of another package, the surge of the vessel on the surface can cause damage to the subsea equipment being landed and the equipment being landed on as they impact one another. Often times the packages must be landed securely before hydraulic connectors can join them together.

Motion compensation is used to detect the motion of the vessel and pay the supporting line in and pull it back by operating the winch as the vessel heaves so that the package near the seafloor can remain vertically stationary and then slowly be lowered to engagement. The default material for the lifting line is a high strength steel cable.

Running heavy subsea packages to depths such as 10,000 feet have the problem that when that much steel cable is deployed, the majority of the cable's strength is consumed in simply holding its own weight as steel cable is relatively heavy.

If a near neutrally buoyant synthetic rope is utilized, most of the cable's strength is retained to lower or lift the subsea load. Synthetic rope is basically a rope made of a high strength form of plastic, so it is relatively light per unit volume.

Wire cable or synthetic rope can be handled on single drum winches or winches which are comprised of a multiplicity of powered sheaves or pulleys. In either case the wire rope or synthetic rope is flexed once in lowering, but is repeatedly flexed during motion compensation times. This is of little consequence in wire cable, but the sliding friction (internal and on the sheaves) of the synthetic rope will generate high heat, potentially to the point of destroying the synthetic rope due to melting.

The capability to lower subsea packages to the seafloor with a synthetic rope under motion compensation control would allow substantially expanded deep sea lifting and lowering capabilities as contemporary winching methods for synthetic rope has the potential for damaging the critical synthetic rope during motion compensation operations.

BRIEF SUMMARY OF THE INVENTION

The object of this invention is to provide a method of providing motion compensation for a synthetic rope without sliding friction heat generation.

A second object of this of this invention is to provide method of motion compensation for a synthetic rope without internal heat generation.

A third objective invention is to provide a method of deep sea lifting capacity without the load capacity being reduced as a function of the depth.

DETAILED DESCRIPTION OF THE INVENTION

Figure 1:
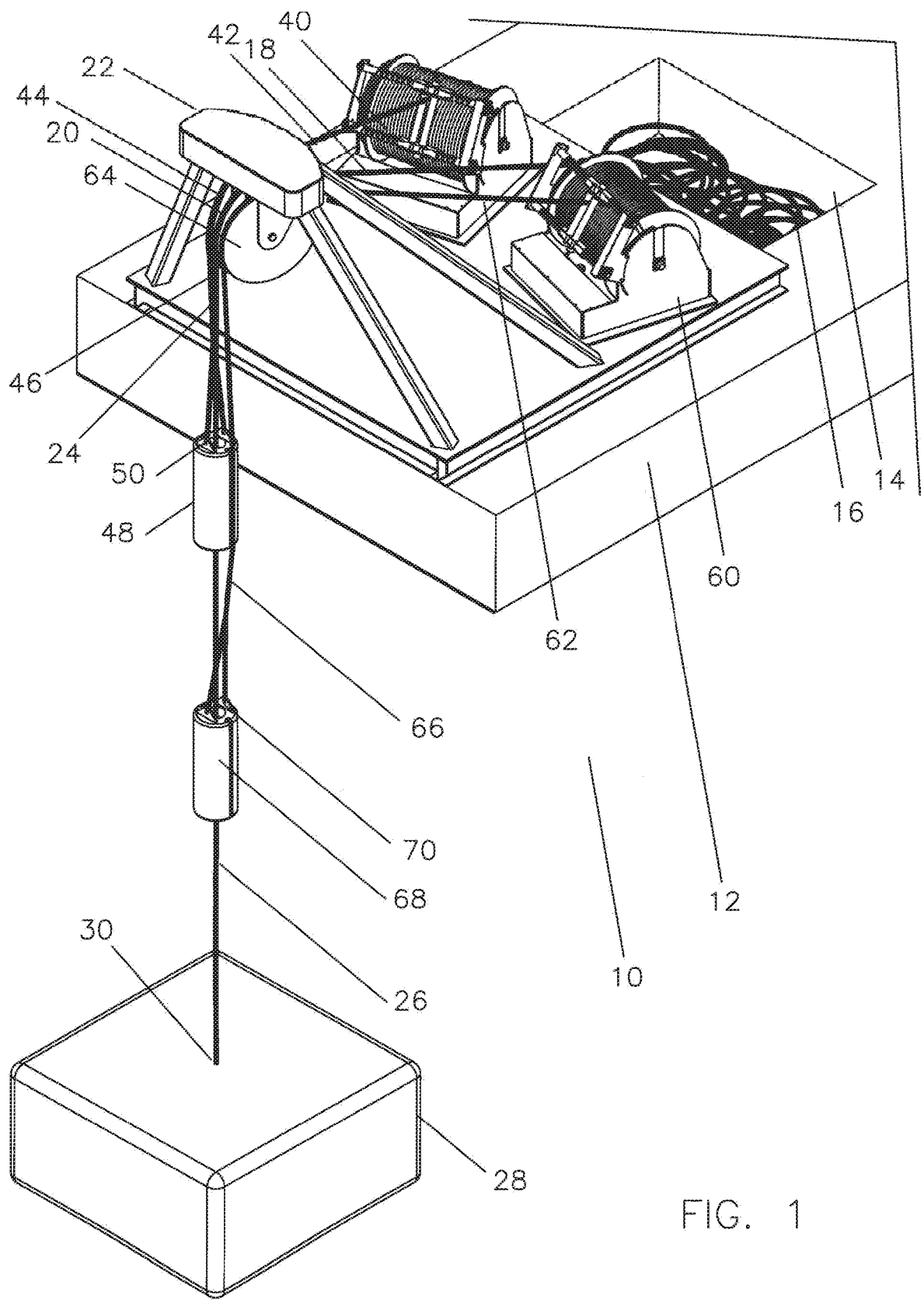
FIG. 1 is a perspective view of a motion compensation system of this invention.

Referring now to FIG. 1, a pictorial view of a motion compensation system 10 is shown being landed on a boat 12 having a storage area 14 for storing a length of synthetic rope 16. The synthetic rope 16 can also be stored on a reel if desired. The synthetic rope 16 is shown coming out of the storage bin at 18, going over a sheave 20 which is supported in a mast 22, continues downwardly at 24 and 26, and connects to subsea package 28 at connection 30.

An upper winch 40 is provided with a wire rope 42 going over sheave 44, with the wire rope continuing downwardly at 46 and connects to gripper 48 at connection 50.

A lower winch 60 is provided with a wire rope 62 going over sheave 64, with the wire rope continuing downwardly at 66 and connects to gripper 68 at connection 70.

As is illustrated, the synthetic rope 16 passes over the sheave 20 with no significant loading, but rather the load of the synthetic rope 16 and the subsea package 28 is carried by either gripper 48 or 68. Gripper 48 and 68 have steel cables which will carry the load over sheaves 44 and 64 respectively. As will be discussed, steel cables can be utilized to pass repeatedly over the sheave with minimal heat build-up and can be wrapped onto the winches tightly to support the loadings. Synthetic rope will generate both substantial and damaging heat if run over a synthetic rope winch and cannot be wrapped tightly on a conventional winch as the outer layers will "knife" in between the inner layers.

Winch 40 lowers its gripper 48 a distance and stops, presume for example fifty feet. The winch 60 will have raised its gripper 68 fifty feet. At that time gripper 68 is engaged with the synthetic rope 16 and then gripper 48 is released. Gripper 68 is now lowered fifty feet and gripper 48 is raised fifty feet. The "hand over hand" process is continued with the subsea package 28 being lowered one hundred feet each cycle. This means that the subsea package 28 can be lowered ten thousand feet to the seafloor with two steel cable winches which have a working length of not much more than fifty feet.

Figure 2:
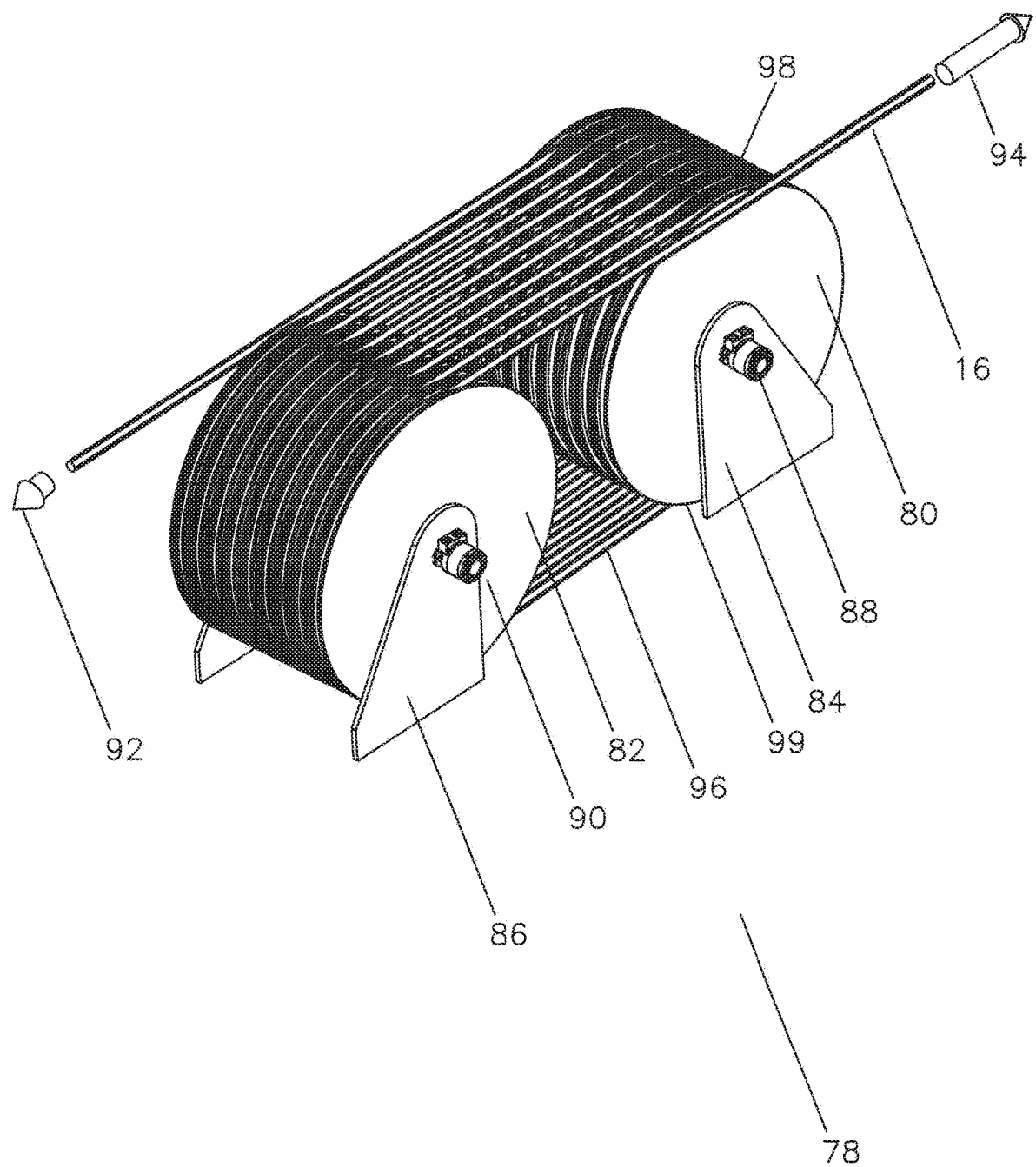
FIG. 2 is a perspective view of a conventional winch for synthetic rope.

Referring now to FIG. 2, a conventional synthetic rope winch 78 is illustrated with synthetic rope 16 wrapped around two sheave groupings 80 and 82 which are mounted on support stands 84 and 86 and are powered by motors 88 and 90. The Sheaves of sheave groupings 80 and 82 are on a common axle (now seen) and therefore all turn the same speed. Each of the sheave groupings illustrated have ten sheaves.

The tension on synthetic rope 16 is indicated as a small load at 92 and as a high load at 94 after passing over the twenty sheaves. This means that the motors 88 and 90 have powered the sheave groupings 80 and 82 respectively and the friction between the synthetic rope 16 and the sheaves has caused a tension to be pulled. If we presume the tension at 92 is effectively zero and the tension at 90 is one hundred thousand pounds, it means on average each sheave has increased the tension of the synthetic rope by five thousand pounds. As synthetic rope is relatively elastic (has a relatively lower spring coefficient), each time five thousand pounds is added to it, the synthetic rope stretches a little more. There are twenty sections of rope 96 between the sheave groupings 80 and 82, each of which is under a different tension. This means that as the synthetic rope begins contact with a sheave such as at 98 until it loses contact with the sheave such as at 99, the tension changes. As the tension changes in the elastic synthetic rope, the length changes. If at any point the synthetic rope is travelling at exactly the same speed as the contact surface on the sheave, it will be travelling at a different speed at all other locations. This means that sliding friction is generated around most of the contact surfaces. If you can imagine that at only one point on one sheave the tension is correct for the synthetic rope to be travelling at the same speed as the surface of the sheaves, then at all other points on all the other nineteen sheaves the speed will not be matched. At all other contact points sliding will be continuously occurring, with the resulting friction heat generation.

You can imagine that with all this sliding going on with high loads, i.e. one million pounds, a lot of heat generation is occurring. When you are doing motion compensation, which means you are going back and forth over the same section of synthetic rope, this generated heat has the potential of building up to the point of damaging the synthetic rope.

Figure 3:
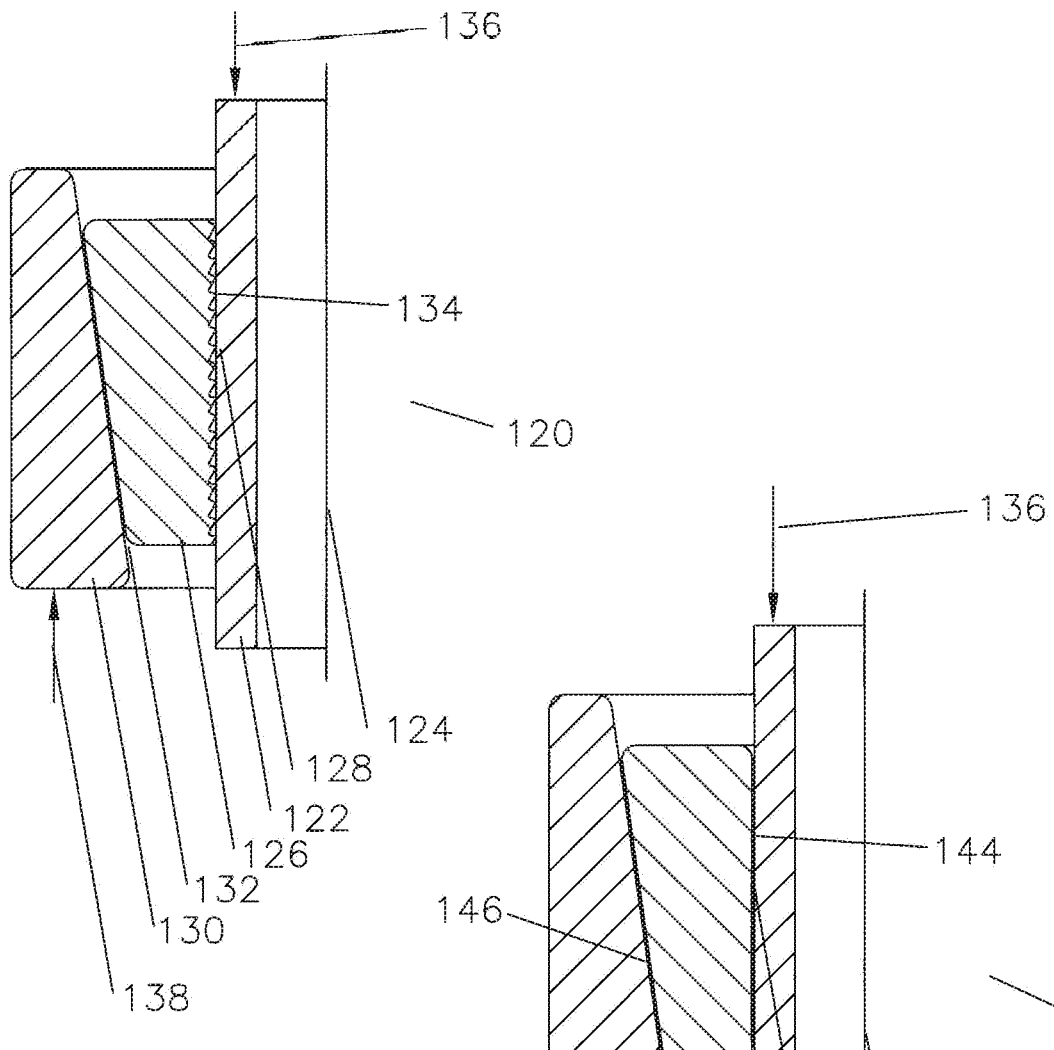
FIG. 3 is a half section illustrating how conventional slips with sharp teeth work.

Referring now to FIG. 3, the difficulty of supporting the synthetic rope with a gripper such as indicated at 48 or 68. The synthetic rope is relatively slippery and is difficult to grip. If it is simply gripped, there is a chance that the grip will slip sooner or later and the rope and subsea package will be lost. It is prudent that a "failsafe" grip will be provided. Failsafe generally means that the higher the load, the higher the gripping force. Conventional failsafe slips for pipe 120 are shown with a steel pipe section 122 about centerline 124, slip segments 126 with sharp teeth 128, and bowl 130. The coefficient of friction 132 between the bowl 130 and the slip segments 126 is in the range of 0.10. The sharp teeth 128 literally bite into the pipe so exact coefficient of friction 134 is questionable, however, it is conventional to use 0.5 as the coefficient of friction to calculate with. This means that when a load 136 is imposed on the pipe and is resisted by a foundation support 138, the slip segments 126 will slip at 132 rather than 134, meaning it wedges more tightly when the load increases—it has "failsafe" support.

Figure 4:
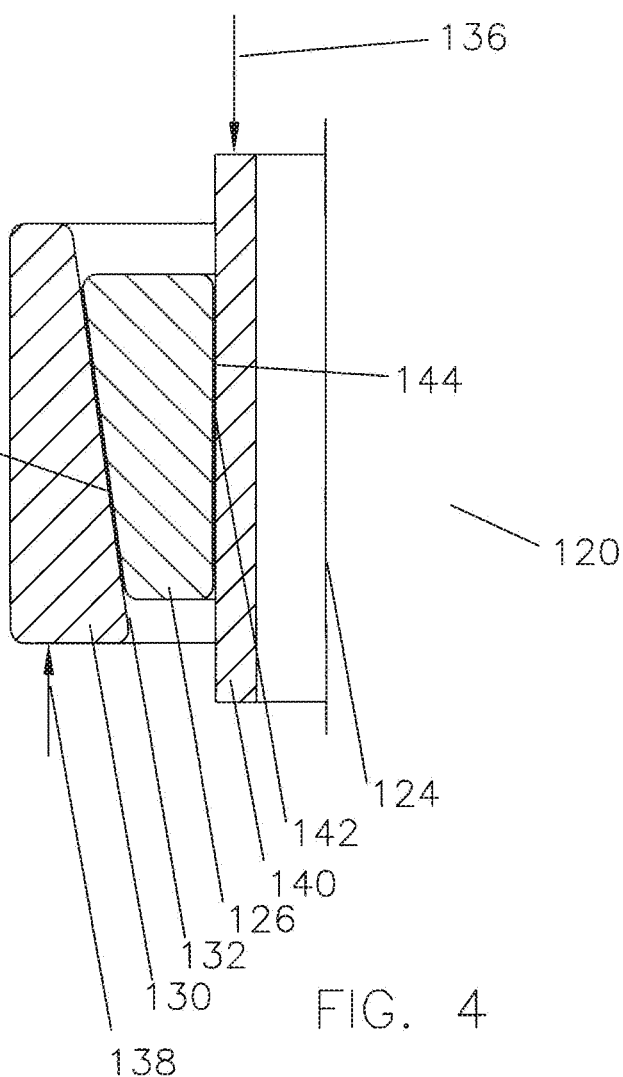
FIG. 4 is a half section of a conventional slip assembly to show what would happen if the sharp teeth were changed to a smooth surface.

Referring now to FIG. 4, it can be seen what happens if the sharp teeth are removed from the slip segments so that they do not cut and damage the synthetic rope. Slip segments 140 have a smooth surface 142 which would have a comparable coefficient of friction 144 of 0.10, or even less as the synthetic rope is slicker than the steel pipe 140 shown. At this point there would be at least a fifty percent chance that the pipe will slip rather than the slip segment sliding down the bowl taper to a tighter grip. The eight degree surface 146 between the slip segments 126 and the bowl 130 add a vertical component resisting slip segment movement, insuring that the pipe will slide in the slips rather than the slip segments sliding down with a tighter grip.

Figure 5:
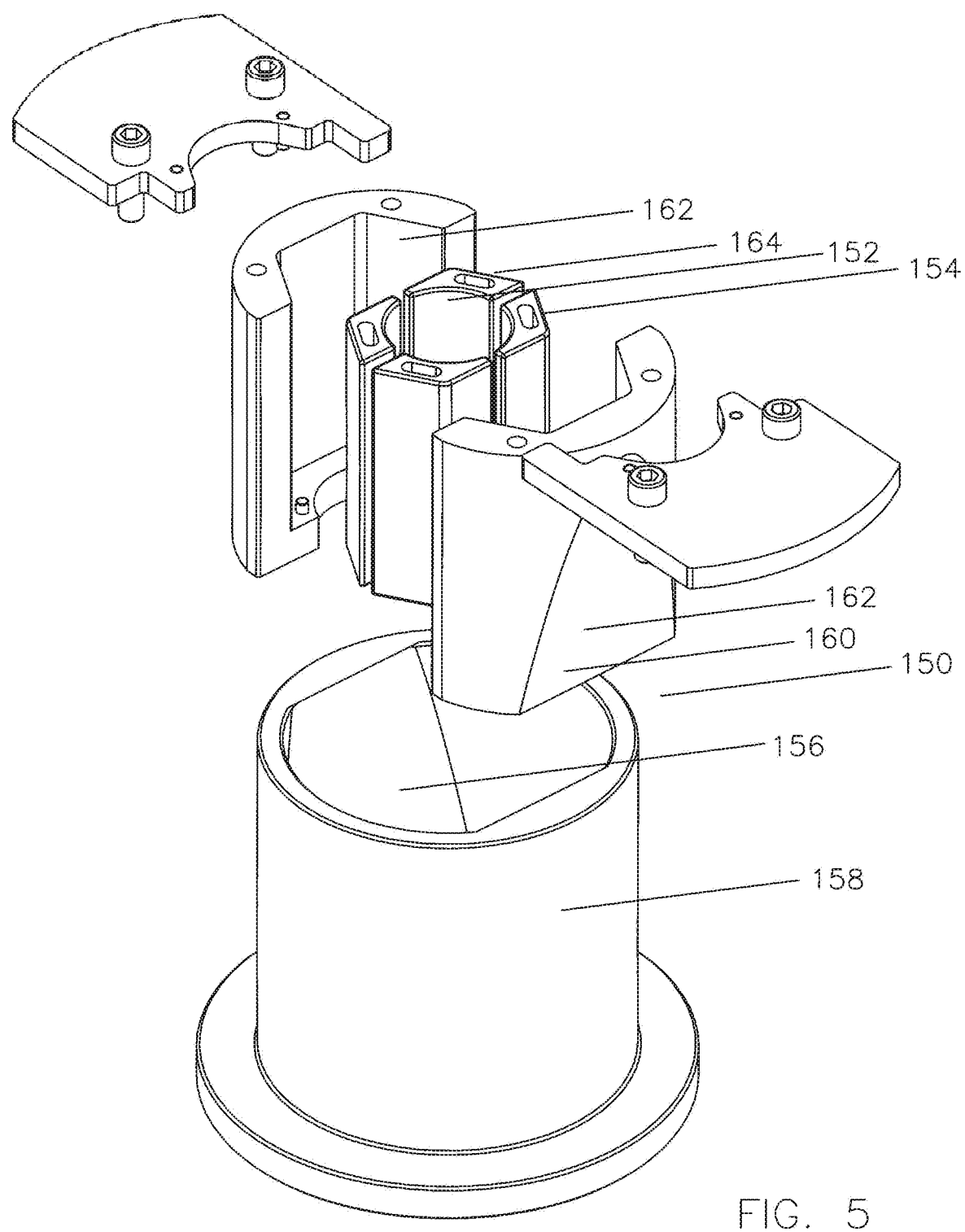
FIG. 5 is a perspective view of a slip assembly illustrating double wedging for failsafe support.

Referring now to FIG. 5, a gripper method 150 is shown and as described in U.S. Pat. No. 6,820,705. Smooth surfaces 152 to engage the synthetic rope are provided on four slip segments 154. Two eight degree surfaces 156 in bowl 158 take the place of the eight degree conical bowl in the conventional slips. When the two eight degree tapered surfaces 160 engage the surfaces 156, the primary force to grip the synthetic rope is provided. In this case the slip carriers 162 have four wedging surfaces 164 which engage mating surfaces 164 on slip segments 154. This means that the force from the eight degree tapered surfaces 156 is wedged or amplified by the surfaces 162 such that the amplified friction force against the synthetic rope will exceed the resisting force from coming up from surface 156. This means that the slip carriers 162 and the slip segments 152 will slip down into increased grip as the load increases making them "failsafe".

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

That which is claimed is:

1. A method of providing motion compensation of a subsea package with a synthetic rope comprising
   supporting said synthetic rope from a synthetic rope winch,
   attaching said synthetic rope to said subsea package,
      supporting a first gripper with a wire rope from a winch capable of motion compensation control characteristics and gripping said synthetic rope with said first gripper,
      supporting a second gripper with a second wire rope from a first winch capable of motion compensation control characteristics, wherein said synthetic rope is at least ten times as long as said first wire rope and said second wire rope and repeating the following sequence:
   gripping said synthetic rope with said first gripper,
   lowering said first gripper while said first winch simultaneously compensates for motion, said synthetic rope, and said subsea package a first distance,
   gripping said synthetic rope with said second gripper,
   releasing said first gripper from said synthetic rope,
   raising said first gripper said first distance,
   lowering said synthetic rope with second gripper a second distance,
   gripping said synthetic rope with said first gripper,
   releasing said second gripper from said synthetic rope,
   raising said second gripper said second distance,
   such that when said subsea package is lowered proximate the subsea landing location said winch capable of operating with motion compensation characteristics can operate to compensate for the vessel motion and smoothly lower said subsea package to said subsea landing location.

2. The method of claim 1 further comprising said first slips and said second slips are failsafe.

3. The method of claim 1 further comprising said first slips and said second slips do not have a friction enhancing tooth profile.

4. The method of claim 1 further comprising said synthetic rope is at least ten times as long as said first wire rope.

5. The method of claim 1 further comprising said first gripper is engaged and released by remote control.

6. The method of claim 1 further comprising said second gripper is engaged and released by remote control.

\* \* \* \* \*